United States Patent
Li

(10) Patent No.: US 9,822,721 B2
(45) Date of Patent: Nov. 21, 2017

(54) METHOD FOR SENSOR INITIALIZATION DURING VEHICLE START-UP

(71) Applicant: Ford Global Technologies, LLC, Dearborn, MI (US)

(72) Inventor: Yonghua Li, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 104 days.

(21) Appl. No.: 14/926,831

(22) Filed: Oct. 29, 2015

(65) Prior Publication Data

US 2017/0122239 A1    May 4, 2017

(51) Int. Cl.
*F02D 41/06* (2006.01)
*G01C 21/26* (2006.01)
*F02D 41/02* (2006.01)

(52) U.S. Cl.
CPC ........... *F02D 41/062* (2013.01); *G01C 21/26* (2013.01); *F02D 41/021* (2013.01); *F02D 2200/0414* (2013.01); *F02D 2200/0416* (2013.01); *F02D 2200/701* (2013.01)

(58) Field of Classification Search
CPC ................. F02D 41/062; F02D 41/021; F02D 2200/0414; F02D 2200/0416; F02D 2200/701; G01C 21/26

USPC ................................ 701/103, 113; 123/179.3
See application file for complete search history.

(56) References Cited

U.S. PATENT DOCUMENTS

| | | | |
|---|---|---|---|
| 5,036,820 A * | 8/1991 | Fujimoto | F02D 41/148 123/686 |
| 7,274,986 B1 | 9/2007 | Petridis et al. | |
| 8,055,438 B2 * | 11/2011 | Neisen | F02D 41/1494 123/142.5 E |
| 8,155,868 B1 | 4/2012 | Xing et al. | |
| 2006/0064232 A1* | 3/2006 | Ampunan | B60T 7/16 701/115 |
| 2011/0093678 A1* | 4/2011 | Miyata | G11B 19/02 711/166 |
| 2012/0158207 A1 | 6/2012 | MacNeille et al. | |
| 2015/0035685 A1 | 2/2015 | Strickland et al. | |

* cited by examiner

*Primary Examiner* — Mahmoud Gimie
(74) *Attorney, Agent, or Firm* — Julia Voutyras; McCoy Russell LLP

(57) ABSTRACT

Methods and systems are provided for ambient temperature estimation and engine control during sensor initialization. In one example, on vehicle start-up after a period of inactivity, during sensor initialization ambient conditions may be estimated using remotely obtained ambient conditions data. Engine actuators may be adjusted based on ambient conditions determined from remote of the vehicle during sensor initialization and on completion of sensor initialization, the engine actuator may be adjusted based on the ambient conditions determined from the sensor.

18 Claims, 5 Drawing Sheets

METHOD FOR SENSOR INITIALIZATION DURING VEHICLE START-UP

FIELD

The present description relates generally to methods and systems for engine control during sensor initialization.

BACKGROUND/SUMMARY

Engine systems include a variety of sensors for measuring ambient conditions, such as ambient temperature, pressure, humidity, etc. Based on the ambient conditions, one or more engine operating parameters may be adjusted to optimize engine performance. For example, based on ambient temperature (for example, the temperature of the air charge received in the engine), parameters such as combustion air-fuel ratio, spark timing, EGR, and purge control may be adjusted. As a vehicle starts-up after a prolonged period of engine inactivity, the sensors require a certain amount of time to initialize before they are fully functional and are able to measure ambient conditions accurately.

One example parameter used for engine control is air charge temperature (ACT) which is estimated via an intake air temperature (IAT) sensor located in an engine intake air passage. After a period of engine inactivity, on vehicle start-up, ACT estimation by the IAT sensor may not be immediately reliable as the sensor initializes during this period. To address this issue, immediately after vehicle start-up, a function of a preset/default value of ACT and/or a filtered reading of the IAT sensor may be used for engine control. However, the inventors have recognized that the ACT value estimated from the function may not be accurate since the preset value may not be close to the actual ambient temperature at that location and at that time. As such, it may take an amount of time (initialization or response time) for the IAT sensor to fully initialize before the ACT value output by the sensor may be directly used. In the meantime, the use of the inaccurate preset value can result in degraded engine performance. The problem may be exacerbated when the engine is restarted after a long period of vehicle inactivity since the longer the period of inactivity, the difference between the actual temperature value and the default temperature value in sensor software may be higher. The last measured temperature value at the vehicle may be significantly different from the current actual temperature. Once the sensor is fully initialized, it is able to estimate ambient conditions within a given error range of the true physical value.

In an alternate approach, shown by MacNeille et al. in US 20120158207, when an ambient weather sensor is limited in its capability, ambient weather conditions are retrieved from a remote server using global positioning system (GPS) coordinates. The weather conditions received from the remote server may be directly used for adjusting engine operations. However, the inventors have recognized potential issues with this approach also. Specifically, the actual engine conditions of the vehicle may be different from ambient conditions as received from the external server. As an example, if a vehicle is parked in a garage, the ambient temperature and humidity as received from the remote server may be significantly different from the actual temperature and humidity experienced at the engine of the vehicle. Herein, as with the use of the preset value, the use of an inaccurate ambient condition estimate can result in degraded engine performance.

As such, there may be one or more other vehicle sensors whose operation and control is affected by the accuracy of the estimated ambient condition. As an example, warming up of an exhaust gas oxygen sensor (such as a UEGO sensor) may be inferred based on the air charge temperature. During the phase where the UEGO sensor has not yet warmed up (such as when the estimated ACT is below a threshold temperature), engine air/fuel ratio may be controlled in an open loop mode. A transition to closed loop control of the engine air/fuel ratio is thus delayed until the UEGO is determined be warm enough, as inferred from the estimated ACT being higher than the threshold. As a result, delays in IAT sensor initialization, and inaccuracies in ACT estimation can result in delays in transitioning of air/fuel ratio control to the closed loop mode, resulting in a drop in fuel economy.

The inventors herein have identified an approach by which the issues described above may be at least partly addressed. One example method for adjusting engine parameters during sensor initialization comprises: during a vehicle start from rest, adjusting an engine actuator based on an ambient condition determined from remote of the vehicle while a vehicle sensor initializes, and then adjusting the engine actuator based on the ambient condition determined from the sensor. In this way, the ambient condition estimate used while a sensor initializes may be rendered more accurate.

As an example, in response to an engine start from rest following a longer period of vehicle inactivity, ambient conditions (e.g., ambient temperature, ambient humidity, etc.) may be obtained from remote of the vehicle while a vehicle sensor (e.g., intake air temperature sensor, humidity sensor, etc.) initializes. For example, the ambient conditions may be retrieved from an external server. The controller on-board the vehicle may include a navigation system via which a location (e.g., GPS co-ordinates of the vehicle) may be transmitted to the external server over a network. Accordingly local ambient conditions for that location may be retrieved from the external server. In another example, the on-board vehicle controller may be communicatively coupled to an indoor (e.g., garage, storage area) temperature sensor through wireless network. In yet another example, the on-board vehicle controller may be communicatively coupled to the on-board controller of one or more other vehicles, such as using vehicle to vehicle (V2V) communication technology. The one or more other vehicles may include other vehicles within a threshold radius of the given vehicle, other vehicles having the same make or model, other vehicles of a fleet to which the given vehicle belongs, etc. Following the vehicle start-up, ambient conditions may be retrieved from the one or more vehicles. For example, a statistical or weighted average of the values retrieved from the one or more vehicles may be used to estimate the ambient condition. In another example, the controller may use a weighted average of the estimate retrieved from the remote vehicles and the estimate retrieved from the remote server. Further still, the weighted average value may be used alongside a filtered reading of the vehicle sensor, or a filtered reading of a default sensor value, for achieving a better accuracy in estimation of engine operating conditions. The remote data is relied on while the sensor initializes. As such, if the vehicle is restarted after a shorter period of inactivity, instead of relying on the remote data, a default value of the ambient condition may be applied until the sensor initializes. Once the sensor has initialized, the sensor output may be used to determine the ambient conditions.

In this way, data regarding vehicle ambient conditions, such as temperature and humidity, may be obtained from one or more reliable sources external to the vehicle during sensor initialization. By relying on ambient condition data retrieved from an external server and/or a remote vehicle, a more accurate estimate of the ambient condition may be provided as compared to a preset value. The technical effect of using ambient condition data from external sources is that sensor initialization time may be significantly reduced. By reducing the initialization time for a vehicle sensor, such as an IAT sensor, accurate ambient condition estimates, such as ACT estimates, may be obtained within a shorter time, reducing a delay in transitioning of air/fuel ratio control from open loop to closed loop mode. Overall, engine performance and fuel economy is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for sensor initialization and adjustment of engine operating parameters e.g., air charge temperature during vehicle start-up. During vehicle start-up ambient conditions may be obtained from external sources such as an external server and/or other similar vehicles using navigation system. During initialization, the sensor may provide an output voltage that is fixed at an initialization value, and/or provide an output voltage that is completely uncorrelated with the sensed value (e.g., temperature). To identify initialization, the controller may have a predetermined duration of known/expected initialization times for each sensor, and/or may monitor the sensor output voltage to identify completion of the initialization.

Figure 1:
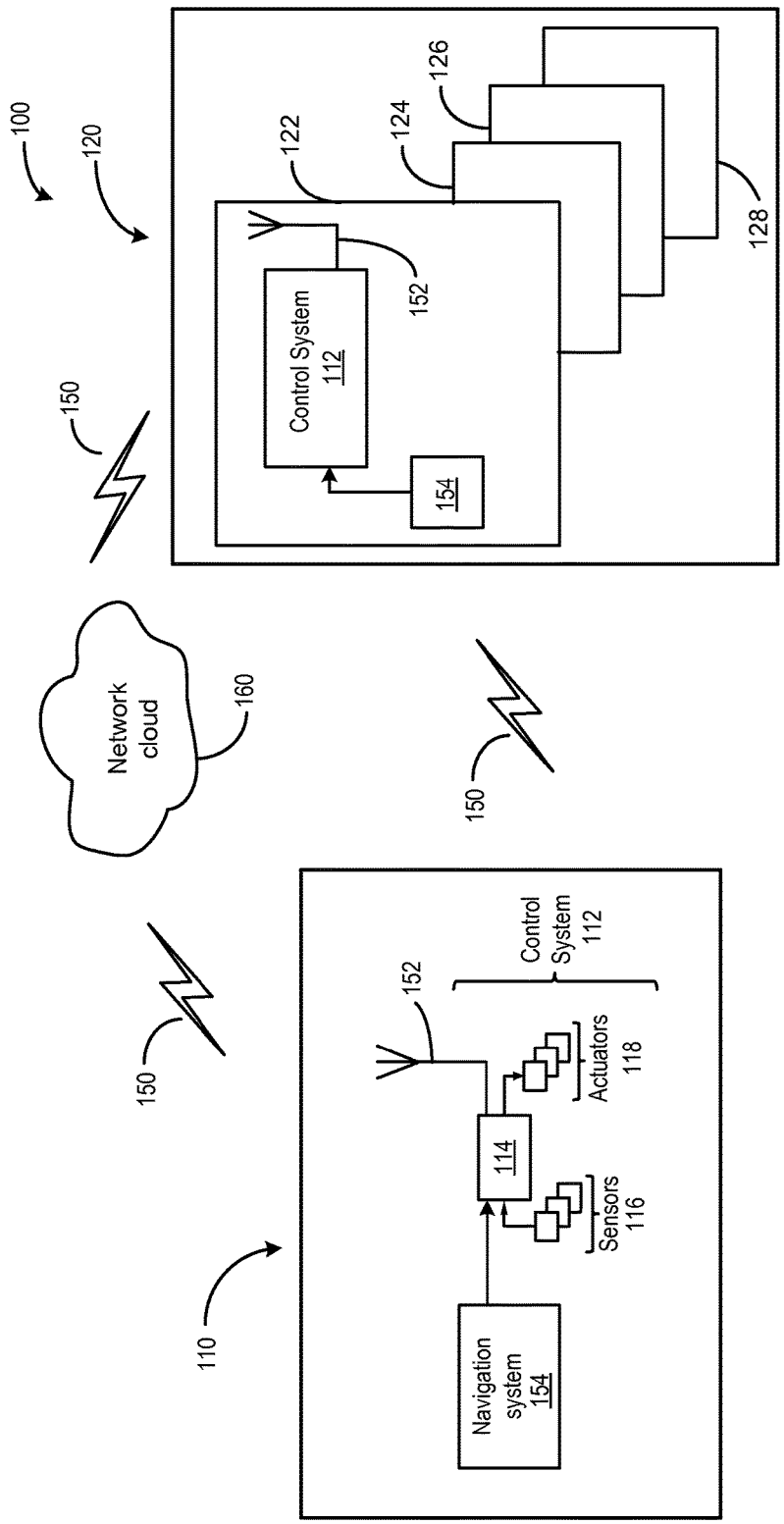
FIG. 1 shows an example embodiment of a vehicle system comprising a navigation system, in communication with an external network and a fleet of vehicles.
Figure 2:
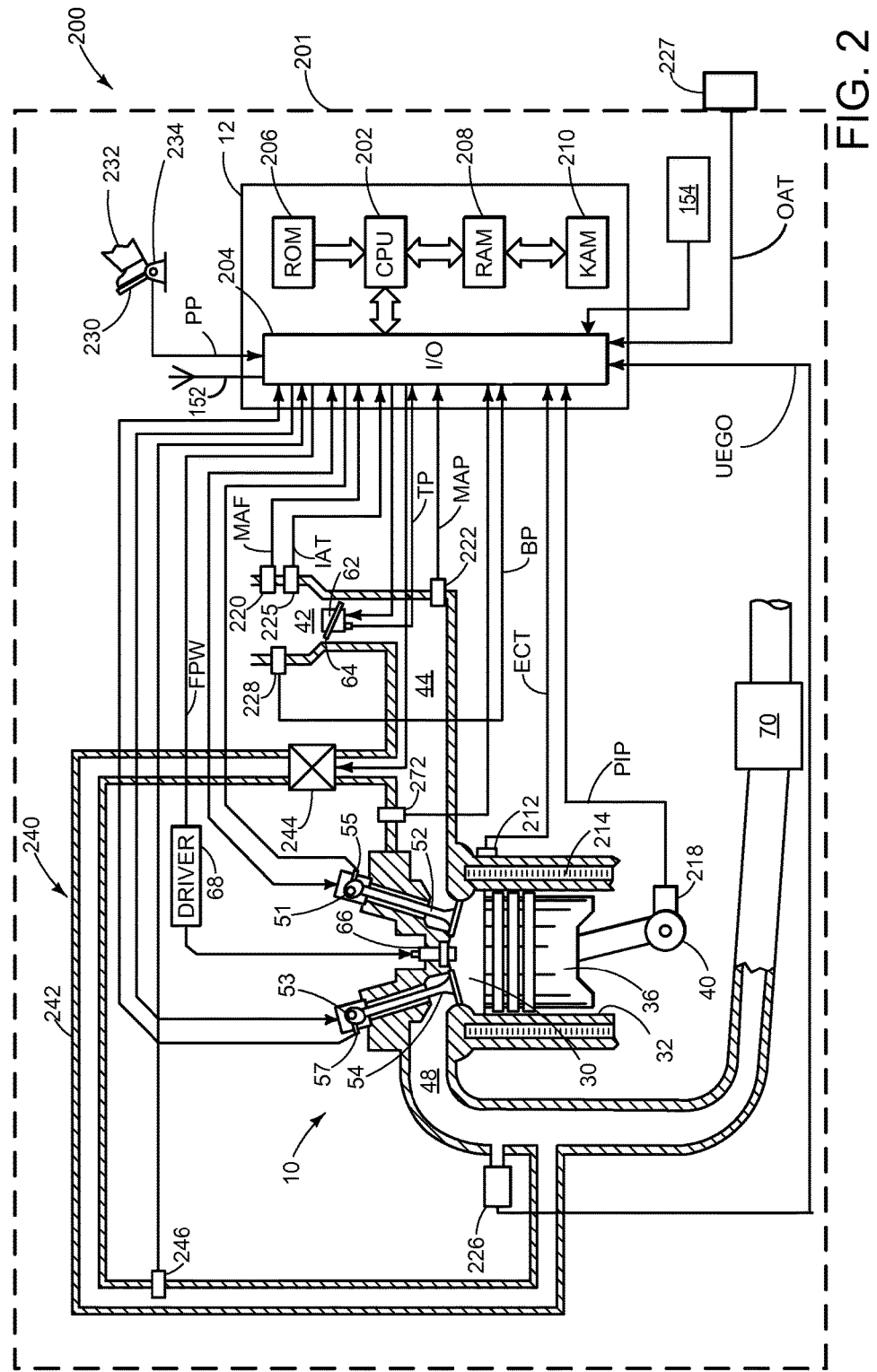
FIG. 2 shows an example engine system including one more sensors for estimating ambient conditions.
Figure 4:
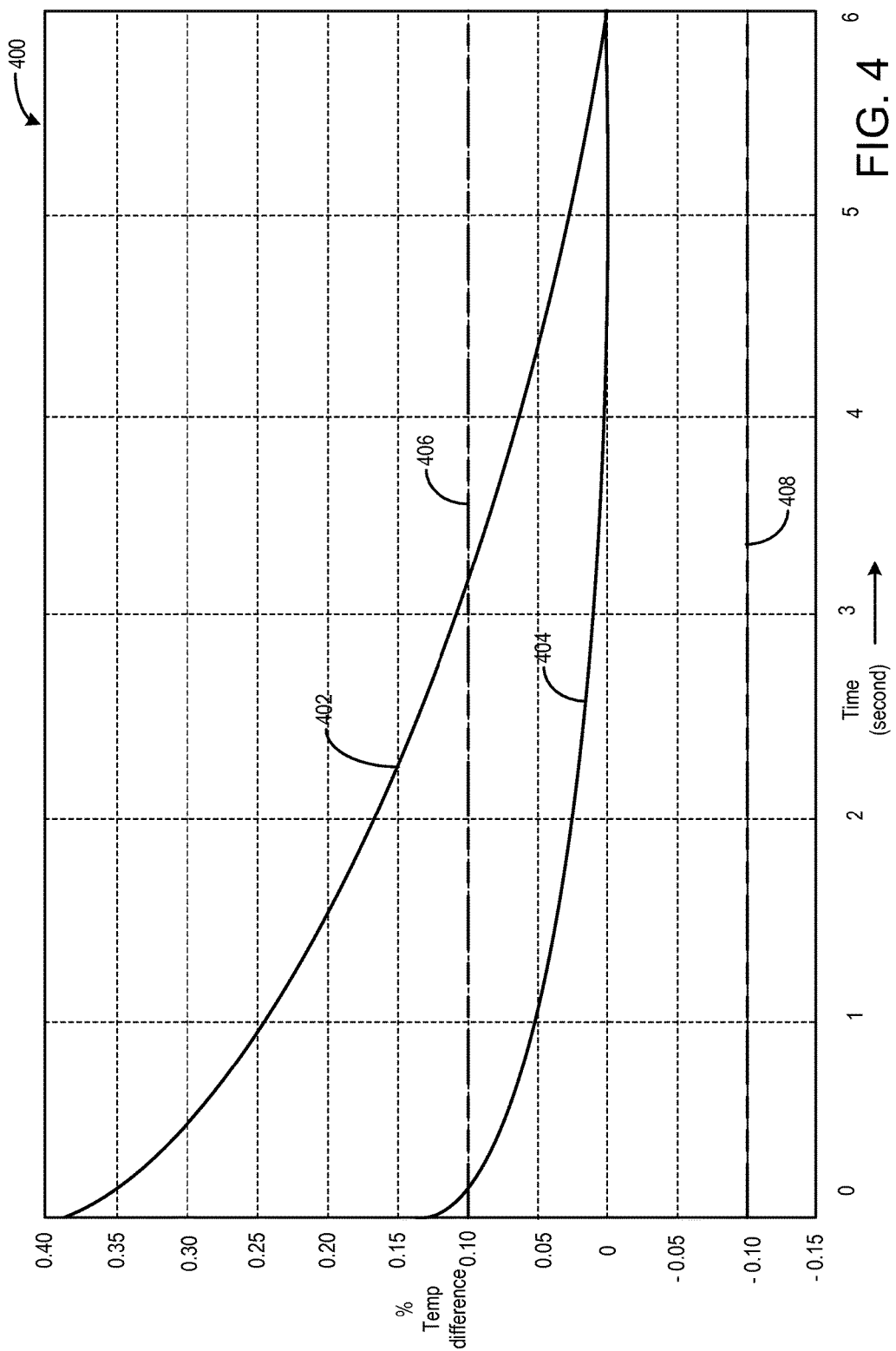
FIG. 4 is an example plot showing difference between temperature estimations from two methods of sensor initialization.
Figure 5:
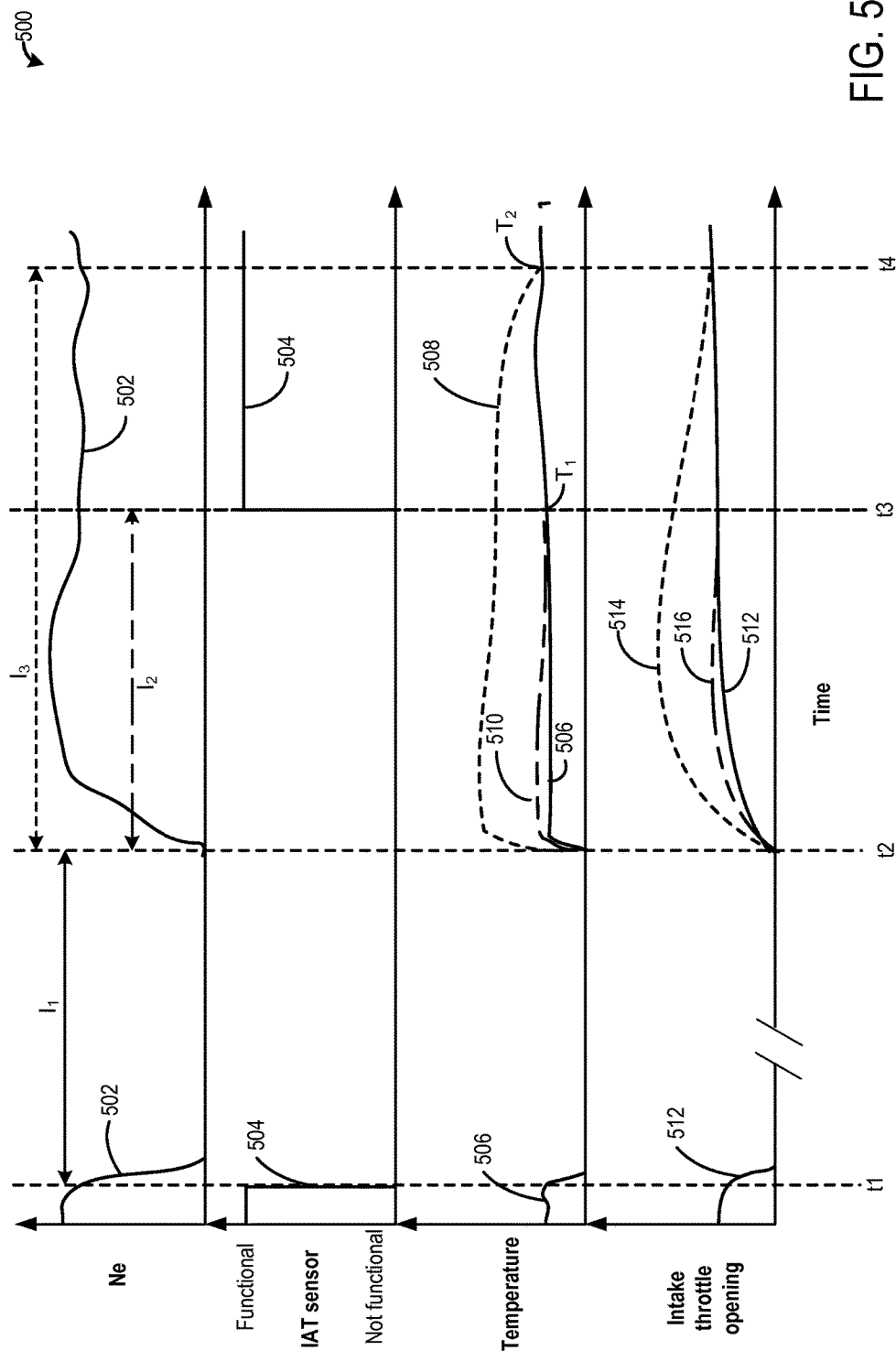
FIG. 5 shows an example of sensor initialization using remotely obtained ambient conditions.

FIG. 1 shows a vehicle in communication with a network cloud and other vehicles in a fleet operating within a certain radius. Air charge temperature is estimated using the intake air sensor which is disposed on the intake manifold of an engine system as shown in FIG. 2. An engine controller may be configured to perform a routine, such as the example routine of FIG. 3 during vehicle start-up to adjust engine operating conditions and facilitate faster sensor initialization. During vehicle start-up, temperature estimation may be carried out based on a function of sensor reading and either a pre-set value or externally obtained ambient conditions. FIG. 4 is an example plot showing difference between temperature estimations from two methods during sensor initialization. FIG. 5 shows an example of sensor initialization using remotely obtained ambient conditions. Variation in intake throttle opening is shown based on ambient temperature during sensor initialization.

FIG. 1 shows example embodiment 100 of a vehicle system 110 in communication with an external network (cloud) 160 and a fleet of vehicles 120. After a period of engine inactivity, on vehicle start-up, sensors require a certain time to initialize before they are fully functional and able to estimate ambient conditions accurately. For example, during this period, as the sensor initializes, air charge temperature (ACT) estimation by the intake air temperature (IAT) sensor may not be reliable. During initialization of IAT sensor, a function of actual ambient temperature and a filtered reading of the IAT sensor may be used to estimate ACT for engine operations. The actual ambient temperature (any ambient condition e.g. humidity, pressure etc.) may be obtained from a remote source e.g. an external server, other similar vehicles.

A vehicle control system 112 may include a controller 114. A navigation system 154 may be coupled to the control system 112 to determine location of the vehicle 110 at key-on and at any other instant of time. At a vehicle key-off, the last location (e.g., GPS co-ordinates of the vehicle) of the vehicle 110 as estimated by the navigation system 154 may be stored by the control system 112 for use during the next key-on event. The navigation system may be connected to an external server and/or network cloud 160 via wireless communication 150. The navigation system 154 may determine the current location of the vehicle 110 and obtain ambient condition data (such as temperature, pressure etc.) from a network cloud 160 for use during sensor initialization. Further details of sensor initialization and engine operation during vehicle start-up will be discussed in relation to FIG. 3. The controller 114 may be coupled to a wireless communication device 152 for direct communication of the vehicle 110 with a network cloud 160. Using the wireless communication device 152, the vehicle 110 may retrieve ambient condition data (such as temperature, pressure etc.) from the network cloud 160 for use during sensor initialization.

Control system 112 is shown receiving information from a plurality of sensors 116 and sending control signals to a plurality of actuators 118. As one example, sensors 116 may include manifold absolute pressure Intake air temperature (IAT) sensor, outside air temperature (OAT) sensor (MAP) sensor, barometric pressure (BP) sensor, exhaust gas oxygen sensor (such as a UEGO sensor), fuel tank pressure sensor and canister temperature sensor. Based on signals received from the different sensors 116, the engine operations are regulated and consequently the controller 114 sends control signals to engine actuators 118.

A fleet 120 of vehicles is shown is shown in FIG. 1. A fleet 120 may comprise of multiple vehicles 122, 124, 126, and 128. In one example, vehicles 122-128 may each be similar in make and model to the vehicle 110. In alternate examples, vehicles 122-128 may be vehicles within a threshold distance of vehicle 110. Further still, vehicles 122-128 may be vehicles that are part of a common fleet as vehicle 110. Each vehicle of the fleet 120 may comprise a control system 112 similar to the control system 112 of vehicle 110. A navigation system 154 and a wireless communication device 152 may be coupled to the control system 112 of each vehicle in the fleet 120. The on-board controllers in the vehicles in the fleet may communicate with each other and to the on-board controller in vehicle 110 via their respective navigation system 154, via wireless communication device 152, and/or via other forms of vehicle to vehicle technology (V2V). The vehicles in the fleet 120 may also communicate with the network cloud 160 via wireless communication 150.

Vehicle 110 may retrieve ambient (such as temperature, humidity etc.) and engine operating (such as air charge temperature) conditions from one or more vehicles in the fleet 120. In one example, the fleet 120 is within a threshold radius of the vehicle 110, the ambient conditions experienced by each of the vehicles in the fleet may be similar to that experienced by the vehicle 110. The threshold radius may be defined as a distance within which the ambient and consequently engine operating conditions may be considered to be similar to those of vehicle 110. A statistical weighted average of the estimate retrieved from each vehicle of the remote fleet of vehicles and the estimate retrieved from the network cloud may be used by the control system 112 of vehicle 110 during sensor initialization. The weighted average value may be used alongside a filtered reading of the vehicle sensor (such as the IAT sensor), or a filtered reading of a default sensor value, for achieving a better accuracy in estimation of engine operating conditions. If the vehicle is restarted after a shorter period of inactivity, instead of using remote data, a preset/default value of the ambient condition may be applied until the sensor initializes.

In this way a vehicle 110 may communicate with remote sources (external network cloud, other vehicles) using one or multiple technologies e.g., wireless communication, navigation system and V2V. Various kinds of data (such as ambient temperature, humidity conditions) may be exchanged among the vehicles and the network cloud and this data may be utilized for vehicle operation during sensor initialization.

FIG. 2 is a schematic diagram showing one cylinder of a multi-cylinder engine 10 in an engine system 200. The engine system 200, may be coupled inside a propulsion system of an on road vehicle system 201. An outside air temperature (OAT) sensor 227 is positioned on the exterior of the vehicle system 201. The OAT sensor estimates the ambient air temperature that is used for engine operations. The engine 10 may be controlled at least partially by a control system including a controller 12 and by input from a vehicle operator 232 via an input device 230. In this example, the input device 230 includes an accelerator pedal and a pedal position sensor 234 for generating a proportional pedal position signal PP. A combustion chamber (cylinder) 30 of the engine 10 may include combustion chamber walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some embodiments, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative embodiments, the intake valve 52 and/or exhaust valve 54 may be controlled by electric valve actuation. For example, the combustion chamber 30 may alternatively include an intake valve controlled via electric valve actuation and an exhaust valve controlled via cam actuation including CPS and/or VCT systems.

A fuel injector 66 is shown coupled directly to combustion chamber 30 for injecting fuel directly therein in proportion to the pulse width of signal FPW received from the controller 12 via an electronic driver 68. In this manner, the fuel injector 66 provides what is known as direct injection of fuel into the combustion chamber 30. The fuel injector may be mounted in the side of the combustion chamber or in the top of the combustion chamber (as shown), for example. Fuel may be delivered to the fuel injector 66 by a fuel system (not shown) including a fuel tank, a fuel pump, and a fuel rail. In some embodiments, the combustion chamber 30 may alternatively or additionally include a fuel injector arranged in the intake manifold 44 in a configuration that provides what is known as port injection of fuel into the intake port upstream of the combustion chamber 30.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal TP. The air intake passage 42 may include an intake air temperature (IAT) sensor 125 and a barometric pressure (BP) sensor 128. The IAT sensor 125 measures intake air temperature from which air charge temperature (ACT) may be estimated to be used in engine operations. Dedicated humidity sensors may be positioned at the intake passage 42 and/or at the exhaust passage 48 upstream of an emission control device 70. In addition, humidity measurement may be carried out using linear oxygen sensors such as an universal or wide-range exhaust gas oxygen (UEGO) sensor 226. During vehicle start-up after a period of inactivity, the IAT sensor (and other sensors e.g., humidity sensor) may require a certain initialization time before being able to accurately measure air temperature and estimate ACT. A method for sensor initialization will be discussed with reference to FIG. 3. The BP sensor 228 estimates the ambient pressure for engine operations and provides a signal to the controller 12. The intake passage 42 may further include a mass air flow sensor 220 and a manifold air pressure sensor 222 for providing respective signals MAF and MAP to the controller 12.

An exhaust gas sensor 226 is shown coupled to the exhaust passage 48 upstream of an emission control device 70. The sensor 226 may be any suitable sensor for providing an indication of exhaust gas air/fuel ratio such as a linear oxygen sensor or UEGO, a two-state oxygen sensor or EGO, a HEGO (heated EGO), a NOx, HC, or CO sensor. This exhaust oxygen sensor 226 may be used for ambient humidity estimation under selected conditions. Warming up of the exhaust gas oxygen sensor 226 may be dependent on the air charge temperature. During vehicle start-up and IAT sensor initialization phase the oxygen sensor 226 may not be warmed up and engine air/fuel ratio control is operated in an open loop mode. Thus, an effective method (such as a method to be discussed in relation to FIG. 3) may be utilized to shorten delays and inaccuracies in ACT estimation in order to facilitate fast transitioning of air/fuel control from an open loop mode to a closed loop (and thereby more fuel efficient) mode.

The emission control device 70 is shown arranged along the exhaust passage 48 downstream of the exhaust gas sensor 126. The device 70 may be a three way catalyst (TWC), NOx trap, various other emission control devices, or combinations thereof. In some embodiments, during operation of the engine 10, the emission control device 70 may be periodically reset by operating at least one cylinder of the engine within a particular air/fuel ratio.

Further, an exhaust gas recirculation (EGR) system 240 may route a desired portion of exhaust gas from the exhaust passage 48 to the intake manifold 44 via an EGR passage 242. The amount of EGR provided to the intake manifold 44 may be varied by the controller 12 via an EGR valve 244. Further, an EGR sensor 246 may be arranged within the EGR passage 242 and may provide an indication of one or more of pressure, temperature, and constituent concentration of the exhaust gas. A linear oxygen sensor 272 may be positioned at the intake passage, downstream of the intake throttle, to facilitate EGR regulation. This oxygen sensor 272 may be used for ambient humidity estimation under selected conditions. Under some conditions, the EGR system 240 may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

The controller 12 is shown in FIG. 1 as a microcomputer, including a microprocessor unit 202, input/output ports 204, an electronic storage medium for executable programs and calibration values shown as read only memory chip 106 in this particular example, random access memory 208, keep alive memory 210, and a data bus. The controller 12 may receive various signals from sensors coupled to the engine 10, in addition to those signals previously discussed, including measurement of inducted mass air flow (MAF) from the mass air flow sensor 220; engine coolant temperature (ECT) from a temperature sensor 212 coupled to a cooling sleeve 214; a profile ignition pickup signal (PIP) from a Hall effect sensor 218 (or other type) coupled to crankshaft 40; throttle position (TP) from a throttle position sensor, and absolute manifold pressure signal, MAP, from the sensor 222. In addition, controller 12 may also receive signals from sensors located external to the vehicle system 201 such as the OAT sensor 227. A navigation system 154 (such as the navigation system 154 in FIG. 1) and a wireless communication device 152 (such as wireless communication device 152 in FIG. 1) may be coupled to the controller 12 for enabling communication of the vehicle system 201 with an external network cloud and/or with other similar vehicles (using V2V technology). During sensor initialization (at vehicle start-up after a prolonged period of engine inactivity) remotely obtained ambient conditions may be used alongside a filtered reading of the vehicle sensor for engine operations. The navigation system 154 and the wireless communication device 152 facilitates retrieving ambient and/or vehicle operating conditions from external network clouds and/or other vehicles. Engine speed signal, RPM, may be generated by the controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, the sensor 218, which is also used as an engine speed sensor, may produce a predetermined number of equally spaced pulses every revolution of the crankshaft.

The storage medium read-only memory 206 can be programmed with computer readable data representing non-transitory instructions executable by the processor 202 for performing the methods described below as well as other variants that are anticipated but not specifically listed. As described above, FIG. 2 shows one cylinder of a multi-cylinder engine, and each cylinder may similarly include its own set of intake/exhaust valves, fuel injector, spark plug, etc.

FIGS. 1 and 2 show example configurations of engine controller and various sensors with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example.

Figure 3:
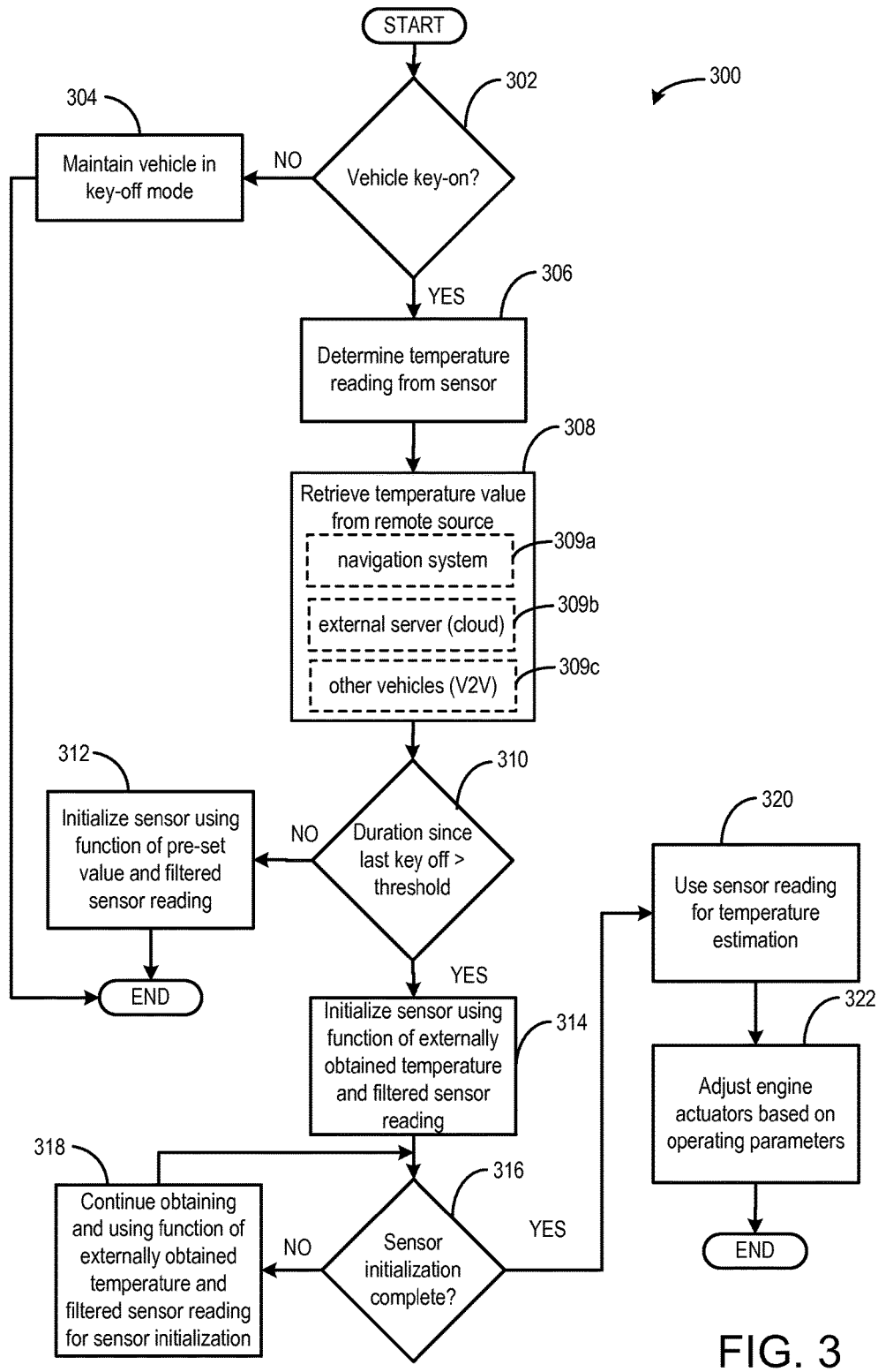
FIG. 3 is a flow chart illustrating an example method that may be implemented during sensor initialization at vehicle start-up.

FIG. 3 illustrates an example method 300 for sensor initialization at vehicle start-up. Method 300 enables, at vehicle start-up (after a period of inactivity), during sensor initialization, adjusting engine actuators based on an estimation of ambient conditions using remotely obtained ambient conditions data. On completion of sensor initialization, the engine actuator may be adjusted based on the ambient conditions determined from the sensor.

The Instructions for carrying out method 300 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

At 302, the routine includes determining if a vehicle key-on event has occurred. In one example, a vehicle the key-on event may be confirmed when the vehicle is started up after a period of engine inactivity in response to the vehicle operator inserting and turning an ignition key (or other active key). However, in alternate vehicle configurations, such as keyless, start/stop button, or passive key configurations, the key-on event may be confirmed in response to operator indicating a request to initiate operation of the vehicle. This may include, as non-limiting example, the vehicle operator pressing a start button, the vehicle operator placing a passive key within the vehicle, etc. As such, during the period of inactivity prior to the key-on event, the vehicle may not be propelled via an engine or an electric motor. When the vehicle starts-up, the different components of the engine system, such as the engine controller, the sensors, and the actuators starts operating. If the vehicle has been inactive for a prolonged duration, the sensors may require a certain amount of time to initialize before they are fully functional and able to provide accurate measurements. The initialization time for a sensor (also known as sensor response time) may depend on the nature of the sensor as well as the duration of inactivity. For example, ambient condition sensors (e.g., temperature, pressure or humidity sensors) may require an amount of time to initialize and provide an accurate estimate of ambient conditions. At 304, if a key-on event is not confirmed, the vehicle is maintained in a key-off mode and the routine comes to an end. In the key-off mode, the vehicle remains inactive and may not be propelled via vehicle engine and/or motor torque.

If a vehicle key-on event is confirmed, the routine includes determining ambient condition readings from the corresponding sensors, such as sensors located at the intake passage or manifold of the vehicle engine or sensors coupled to the vehicle surface, at 306. The vehicle sensors may include, as an example, one of an intake air temperature sensor and a humidity sensor, wherein the ambient condition includes one of an intake air charge temperature and an ambient humidity estimate.

It will be appreciated that the present example is hereafter described with reference to an intake air temperature estimate as determined while an IAT sensor initializes. However, this is not meant to be limiting and the same may be likewise performed for one or more additional or alternate ambient conditions while corresponding sensors initialize.

Following the determination of ambient conditions (herein depicted as temperature), at 308 ambient condition data may be retrieved from a remote source. The vehicle may include a navigation system communicatively coupled to an on-board controller, the on-board controller communicatively coupled to a remote, off-board controller via a network, and the ambient conditions may be retrieved at the on-board controller from the off-board controller via the network.

In one example, as indicated at 309a, the location (e.g., global positioning system (GPS) co-ordinates) of the vehicle may be determined at the navigation system and transmitted from the on-board controller to a remote, off-board controller via a network, and the ambient conditions may then be retrieved from the off-board controller based on the transmitted last known location. The vehicle location at the time of last key-off may be stored in the controller's non-transitory memory and on vehicle start-up, the previously obtained location may be used. In this way, the ambient condition determined from remote of the vehicle may be based on a last known location of the vehicle. The navigation system may communicate with the remote off-board controller, such as with an external server or cloud network to obtain the relevant ambient conditions (temperature, humidity etc.) at that location at that time. In some examples, if the vehicle is parked in a garage, ambient conditions data for the garage may be retrieved by the vehicle navigation system on communication with an external network. In another example, as indicated at 309b, a wireless communication device disposed on a vehicle may directly communicate with a network cloud via wireless communication to obtain ambient conditions data. Further still, temperature readings from a storage place, for example from a parking garage, may be transmitted to a vicinity of the garage to be used by nearby vehicles communicating via wireless communication. If a vehicle is parked in the garage and ambient condition data is available from the garage, the on-board wireless communication device may retrieve the ambient conditions data directly from the garage.

In yet another example, such as at 309c retrieving ambient data from remote of the vehicle may include using vehicle to vehicle (V2V) technology to communicate with one or more vehicles. The vehicles may be part of a common fleet of vehicles, vehicle of a similar make, and/or model, vehicles operational within a threshold radius of the given vehicle, or combinations thereof. The given vehicle may include an on-board controller that is communicatively coupled to the on-board controller of each of the remote vehicles via a network, and the ambient conditions may be retrieved from the on-board controller of at least one of the one or more remote vehicles. The communicating vehicles may be within a defined threshold radius of the given vehicle such that the ambient conditions experienced by the remote vehicles are similar to those experienced by the given vehicle. The threshold radius may be set based on a distance from the given vehicle within which the ambient conditions of the remote vehicles may be considered to be similar. If communicating with vehicles of the same or similar make and model, the operating conditions may be similar, therefore, in addition to ambient conditions, engine operating conditions such as ACT may also be obtained using V2V technology.

Data from one or more of the external sources may be combined to obtain an accurate estimate of the ambient conditions (temperature, humidity). As an example, a weighted average of the estimate retrieved from the remote vehicles and the estimate retrieved from the remote server may be used during sensor initialization. The weightage assigned to the remote vehicles may be varied based on parameters such as their distance from the given vehicle (e.g., more weightage to closer vehicles), as well as their make and model (e.g., more weightage to vehicles of same make or model). The weighted average value may also be used alongside a filtered reading of the vehicle sensor, or a filtered reading of a default sensor value, for achieving a higher accuracy in estimation of engine operating conditions.

At 310, the routine includes determining if the duration since the last key-off event is greater than a threshold duration. The threshold duration may be determined based on sensor characteristics (such as initialization time period, type of sensor, ambient condition being estimated, etc.). As an example, if the duration of engine inactivity (since last key-off) is shorter than the threshold duration, the sensor may not require a long initialization process and may be able to estimate ambient conditions within a shorter time.

At 312, as such, if the vehicle is restarted after a shorter period of inactivity (short duration since last key-off), a default setting of the sensor may be used to estimate the ambient condition and adjust one or more engine actuators. In this case, the ambient conditions determined from remote of the vehicle may be ignored and the engine actuators may be adjusted independent of the ambient condition determined from remote of the vehicle. As an example, a default temperature value may be determined based on the intake air temperature sensor characteristics, engine operating parameters and ambient conditions. The default setting of the sensor may be filtered with a time-constant based on a time required for vehicle sensor initialization.

In one example, for an IAT sensor, the estimation of IAT (or ACT) after a short period of inactivity is given by equation 1:

$$T_f(t) = A + C*T_m(t) \tag{1}$$

Where $T_f(t)$ is an estimated value of IAT (or ACT), A is a default constant temperature, C is a time constant for the IAT sensor and $T_m(t)$ is the IAT sensor reading measured by the sensor at a time t (time of engine start-up). Since in this case the duration of engine inactivity is short, the sensor reading is close to the estimated (actual) value of IAT and the sensor does not require a significant amount of time for initialization. During sensor initialization engine parameters, e.g. the intake throttle, may be adjusted based on a default setting of the vehicle sensor, and independent of the remote estimate. In this case following the initialization of the sensor, the routine ends.

Once temperature data has been retrieved from a remote source, at 314 the controller uses a function of the remotely obtained data and filtered sensor reading for sensor initialization. In particular, the function blends the remotely obtained data with the sensor reading to provide a blended temperature estimate that is used during a sensor initialization period (that is, before a reading of the sensor can be used directly, without any adjustments). As an example, for the IAT sensor, an estimation of IAT (or ACT) after a prolonged period of inactivity is given by equation 2:

$$T_f(t) = \alpha(t) * T_e(t) + (1 - \alpha(t)) * T_m(t), \tag{2}$$

where $$\alpha(t) = e^{-\frac{t}{N*T_C}}, \tag{3}$$

where $T_f(t)$ is the estimated value of IAT (or ACT), $T_e(t)$, is the temperature value obtained from an external source, $T_m(t)$ is the temperature value measured by the IAT sensor at a time t, N is a constant greater than or equal to 1, and $T_c$ is a time constant of the IAT (or ACT) sensor. The time constant $T_c$ may be a fixed value for a given sensor while N may be adjustable.

During sensor initialization, estimated ACT value, $T_f(t)$ may be used for engine operations. As an example, after engine start-up, during an initial part of the sensor initialization, while estimating the ACT value by blending the externally sourced data and the sensor data, the blending function may give more weightage to the externally obtained temperature value and less weightage to the sensor measured temperature value. In a later part of the sensor initialization, such as when approaching a time when sensor initialization is almost complete, while estimating the ACT value, the blending function may give more weightage to the sensor reading and a less weightage to the externally sourced reading. As a result of the blending, the estimated ACT value, $T_f(t)$ may be within a given error range of the true physical value. The time constant for the sensor may be a fixed value and the constant N may vary depending on the duration of engine inactivity. Thus, the longer the duration of engine inactivity, the longer the duration over which the blending of the remotely obtained data with the sensor reading is continued to obtain an ACT temperature estimate that is within the given error range of the true physical value. The exponential weight factor in equation 3 may be designed (by varying the constant N) such that it approaches zero as the sensor fully initializes. Over time, as the factor $\alpha(t)$ approaches zero when the sensor is fully initialized, the estimated value of IAT (or ACT) is equal to the temperature value measured by the sensor. By using ambient temperature value closer to actual temperature experienced by the vehicle for sensor initialization, it takes a shorter time to estimate ACT temperature within a given error range of the actual value. When the sensor is fully initialized, it is able to independently measure temperature reliably without the requirement of blending the sensor reading with the externally obtained temperature value. In one example, if an ambient temperature is at 80° F., and default temperature value of the sensor is set at 20° F., it may take longer for the sensor to produce an estimate that is within 1% of the real value of 80° F. as compared to the time required to estimate temperature reliably (within 1% error range) using an initial value of 75° F.

During the initialization process after a long period of engine inactivity, the difference between estimated IAT (or ACT) is small in the case where ambient temperature obtained from external sources is used during sensor initialization compared to using a default temperature (as shown in equation 1). An example temperature difference between the actual and estimated value and improvement in initialization (response) time is discussed in relation to FIG. 4.

At 316, the routine includes determining if the sensor initialization process is complete. The completion of sensor initialization is dependent on the time constant Tc and the constant N of equation 3 which in turn may depend on the duration of engine inactivity prior to vehicle start-up. The longer the duration of the inactive period, it is more likely that the actual physical temperature value to be measured has changed significantly as compared to a default value, or last measured value before the vehicle shut down. If the sensor initialization is not complete, the controller continues to use a function (such as the function of equation 2) of remotely obtained temperature and filtered sensor reading for engine operation. During this period, engine parameters may be adjusted based on the IAT and/or ACT estimated from equation 2.

Once the sensor initialization is complete, the exponential weight factor (equation 3) approaches zero, as seen from equation 2, and the temperature estimate equals the temperature measured by the sensor (without a filtering factor). At 320, once the sensor has initialized, the sensor reading is directly used for ambient condition (herein IAT or ACT) estimation. At this stage it is no longer necessary to obtain temperature data from a remote source.

Once the sensor initialization is complete, engine actuators may be adjusted based on an ambient condition determined from the vehicle sensor. As an example, warming up of the UEGO sensor may be inferred based on the air charge temperature. UEGO sensors may be used for engine air/fuel ratio estimation. During the phase where the UEGO sensor has not yet warmed up (such as when the estimated ACT is below a threshold temperature), engine air/fuel ratio may be controlled in an open loop mode. A transition to closed loop control of the engine air/fuel ratio is delayed until the UEGO is determined be warm enough, as inferred from the estimated ACT being higher than the threshold. Therefore, an accurate estimation of ACT is required to determine the warming of an UEGO sensor. Delays in IAT sensor initialization, and inaccuracies in ACT estimation can result in delays in transitioning of air/fuel ratio control to the closed loop mode, resulting in a drop in fuel economy. Throttle opening and cylinder fuel injector may be adjusted based on air/fuel ratio determination using an UEGO sensor. Thereby reliable operation of UEGO sensor is important for adjusting intake throttle opening and cylinder fuel injector.

In this way during a first engine restart from engine rest, an engine actuator is adjusted based on an ambient condition determined from remote of the vehicle while a vehicle sensor initializes; and during a second engine restart from engine rest, engine actuator is adjusted based on an ambient condition determined from a default setting of the sensor while the vehicle sensor initializes. In this example, the first engine restart is from a first duration of engine rest and the second engine restart is from a second duration of engine rest, the second duration shorter than the first duration. This method for sensor initialization may be applied for other sensors such as a barometric pressure (BP) sensor, humidity sensor etc. in the vehicle engine system.

FIG. 4 shows an improvement in sensor initialization time using a method based on remotely obtained temperature data compared to a method using a default temperature value for sensor initialization. At vehicle start-up, sensors such as the intake air temperature (IAT) sensor require an amount of time to initialize before being able to reliably measure IAT or air charge temperature (ACT). During IAT sensor initialization, a default temperature value may be used for engine operations alongside a filtered reading of the vehicle sensor. However, the default temperature value estimated by this first method (herein also referred to as the default data method) may not be sufficiently close to the actual ambient temperature value, and as a result, the IAT or ACT estimate used during sensor initialization may not be accurate. In addition, when using a default value for sensor initialization, it may take a significantly longer time for the sensor to be completely functional (the estimated value is within given error range of the actual value).

A second method introduced in the present disclosure relies on a remotely obtained temperature value that may be used alongside a filtered reading of the vehicle sensor for engine operations while the sensor initializes (herein also referred to as the remote data method). For the second, remote data method, the temperature value (remotely obtained) may be obtained from at least one of a remote server and remote vehicle(s). The function may be used to blend the remotely obtained temperature and the sensor reading to estimate ACT and/or IAT during sensor initialization period. An example comparison of a percentage temperature difference (% error) between the actual and estimated temperature value (during sensor initialization) and difference in initialization (response) time for the two above-discussed initialization methods (the first default data method and the second remote data method) is shown in plot 400 of FIG. 4.

The x-axis shows time (in seconds) and the y-axis shows the percentage difference (% error) in ACT temperature between actual ACT and ACT estimated from one of the two methods. The actual ACT value is a temperature estimate based on ambient temperature that would have been estimated by a fully functional IAT sensor. If the estimated temperature is within an error range, the temperature may be used for engine operation. Lines 406 and 408 show upper and lower limits of an example permissible % error range for temperature estimation. The variation in % error over time for first method is shown in plot 402. It is observed from the plot 402 that the % error between actual ACT value and estimation from first method is significant and during the initial part of sensor initialization, the estimated ACT value is outside the given error range. During this period, the use of the estimated value from the first method may not be beneficial for engine operations. It may be also noted that for first method it takes a significant amount of time (6 seconds in this example) for the sensor reading to reach actual ACT value.

The variation in % error over time for method 2 is shown in plot 404. Compared to plot 402, it is observed that in plot 404, the % error between actual ACT value and estimation from second method is small. Within the first second, the estimated ACT value is within the given % error range and it may be utilized for engine operations. By utilizing remotely obtained ambient temperature values, it is possible to initialize the IAT sensor with a temperature value close to the actual IAT. The default used in first default data method may be significantly different from the actual ambient condition thereby accounting for the bigger % error in plot 402. For the second remote data method, the time required for the sensor to be fully initialized and to measure the ACT temperature accurately is significantly lower for second method compared to first method. In this example, the time required for % error to be within the given % error range and then to converge to zero for second method is almost half of the time required in case of first method. For second method, the time constant(s) used for filtering sensor reading may be adjusted based on the duration of engine inactivity prior to vehicle start-up, such that once the sensor initialization is complete, the temperature estimation from the IAT sensor may be directly utilized for engine operations (the exponential weight factor of equation 3 approaches zero) without the requirement of a corrective function and blending. In this way it is seen that second method, using a function of remotely obtained temperature value and filtered sensor reading is advantageous over the conventional method of using a function of a pre-fixed value and filtered sensor reading.

FIG. 5 shows an example operating sequence 500 illustrating sensor initialization using remotely obtained and default ambient conditions. In this example, initialization of the intake air temperature (IAT) sensor is discussed. The horizontal (x-axis) denotes time and the vertical markers t1-t4 identify significant times for sensor initialization.

The first plot from the top shows variation in engine speed (line 502) over time. The second plot (504) indicates the state of the IAT sensor. As a vehicle starts-up after a prolonged period of engine inactivity, the IAT sensor requires a certain amount of time to initialize before they are fully functional and able to measure ambient temperature accurately. The IAT sensor may not be functional either when it is in an off state or when it is not fully initialized. The third plot (506) shows variation in actual ambient temperature over time. When the IAT is fully initialized and functional, the temperature estimated from IAT sensor is the same as the actual ambient temperature at that time. In this example, the vehicle includes a navigation system and an on-board controller communicatively coupled to each of an off-board controller and a remote vehicle via a network. During engine start after a period of inactivity, geographical location of the vehicle may be transmitted to the off-board controller and ambient condition may be retrieved from one or more of the off-board controller and the remote vehicle. A weighted average of the estimate retrieved from remote vehicles and the estimate retrieved from a remote server may be used alongside a filtered reading of the vehicle sensor for estimation of engine operating conditions (as per the second, remote data method discussed above with reference to FIG. 4). This is compared to temperature estimation using a default temperature value alongside a filtered reading of the vehicle sensor, and use of the estimated temperature for adjusting engine operations until the sensor initializes (as per the first, default data method discussed above with reference to FIG. 4). Dotted lines 508 and 510 show temperature estimates obtained by using first method and second method respectively, during IAT sensor initialization. $T_1$, $T_2$, $T_3$ and $T_4$ are significant temperature values during IAT sensor initialization. The fourth plot (512) shows change in intake throttle opening with time corresponding to actual ambient temperature (line 506). During IAT sensor initialization, the intake throttle opening is adjusted based on temperature estimation using one of first method and second method. Change in intake throttle opening over time, based on temperature estimation from first method is shown by line doted 514 and based on temperature estimation from second method is shown by dotted line 516.

Prior to time t1, the engine is operational and the engine speed varies with time as shown by line 502. The position of line 504 shows that during this period, the IAT sensor is functional (and fully initialized after last engine shut-off) and is able to effectively estimate IAT. The temperature estimated from the IAT sensor (line 506) is the actual ambient temperature. Based on engine operating conditions e.g. air/fuel ratio, the intake throttle (line 512) is adjusted over time. For the accurate estimation of air/fuel ratio by an activated UEGO sensor, an accurate temperature estimate from an operational IAT sensor is required.

At time t1, the vehicle engine is turned off and consequently the engine speed decreases to zero as seen from line 502. Following the engine shut down, the IAT sensor also shuts down and is no longer functional, as shown by the position of the line 504. As the IAT sensor is not functional after time t1, temperature estimate is no longer available after this time (from the sensor) until the sensor is turned on and is initialized. Also, as the engine is turned off, after time t1, air is no longer required in the intake manifold and the intake throttle opening is closed.

Between time t1 and t2, the vehicle is inactive and the engine is maintained in the off state. Consequently, the engine speed is zero during this period. Also, the IAT sensor is maintained in the off position and there is no temperature estimation available between time t1 and t2. Due to engine inactivity, the intake throttle is maintained in closed position. The time interval between time t1 and t2, $I_1$, may be different based on the period of engine inactivity. During time interval $I_1$, the vehicle engine is inactive.

At time t2, the vehicle engine is started after a period of inactivity ($I_1$). The engine restarts at this time and the engine speed gradually increases and stabilizes based on engine load and other operating parameters. As the vehicle starts-up after a period of engine inactivity, the IAT sensor requires a certain amount of time to initialize. Therefore immediately after time t2, the IAT sensor initializes and is not functional to accurately estimate temperature. During this initialization period the engine operations are adjusted based on temperature estimates determined by one of first method and second method. The temperature estimate from the IAT sensor as it initializes may be used for temperature estimation by first and second methods. The details of the sensor initialization methods were described in relation to FIG. 3. As seen from line 508, the temperature estimate as determined by using a default temperature value alongside a filtered IAT sensor reading (first, default data method) is significantly different from the actual temperature value (line 506). The temperature estimate (line 510) determined by using a remote temperature value alongside a filtered IAT sensor reading (second, remote data method) is closer to the actual temperature value (line 506).

Between time t2 and t3, with the progress of sensor initialization, as seen from the lines 506 and 510, the difference in temperature estimate by first method and the actual temperature decreases. Similarly, between time t2 and t4, with the progress of sensor initialization, as seen from the lines 506 and 508, the difference in temperature estimate by first method and the actual temperature decreases. However, the temperature difference between the actual temperature and temperature estimate by first, default data method is significantly greater than the temperature difference between the actual temperature and temperature estimate by the second, remote data method. Therefore by relying on remote data as per the second method, instead of default data using the first method, for the estimation of temperature during sensor initialization, engine operations may be adjusted with higher accuracy.

At time t2, as the engine is started-up, an exhaust gas oxygen sensor (such as an UEGO sensor) may be used to estimate air/fuel ratio. Warming up of the oxygen sensor may be inferred based on the air charge temperature. Intake throttle opening may be adjusted based on air/fuel ratio estimation. At time t2, the intake throttle is opened to a degree based on estimated IAT. Line 512 shows an intake throttle opening corresponding to actual IAT. However, during sensor initialization period, IAT may be estimated by one of first and second method. Between time t2 and t4, in case of temperature estimate by first method, the intake throttle opening is adjusted as shown by line 514. It is seen that there is a significant difference between intake throttle opening based on actual temperature and intake throttle opening based on temperature estimate from first method. This is due to the significant difference between actual temperature and temperature estimate from first method. Similarly, between time t2 and t3, in case of temperature estimate by second method, the intake throttle opening is adjusted, as shown by line 516. It can be seen that the intake throttle opening based on temperature estimate from second method is closer to the intake throttle openings based on actual temperature. This is because by using remotely obtained temperature data alongside sensor reading, it is possible to estimate temperature value closer to the actual temperature.

Between time t2 and t3, with the progress of sensor initialization, as seen from the lines 512 and 516, the difference in intake throttle opening based on second method and the intake throttle opening based on actual temperature decreases. This is due to the increasing accuracy of the temperature estimation using second method as sensor initialization progresses. Similarly, between time t2 and t4, as seen from the lines 512 and 514, the difference in intake throttle opening based on first method and the intake throttle opening based on actual temperature decreases. However it takes a significantly longer time for the intake throttle opening based on first method to be close to the intake throttle opening based on actual temperature.

At time t3, it is seen that the temperature $T_1$, as estimated by using first method is equal to the actual temperature. At this stage, it may be inferred that the sensor initialization is complete and the sensor is able to independently estimate temperature without the utilization of remote temperature. The time interval $I_2$ is the sensor initialization time using second method. Once the sensor initialization is complete, the sensor is now operational (as shown by line 504). Also, due to accurate temperature estimation by the IAT sensor at t3, the intake throttle opening based on temperature estimate from second method is equal to throttle opening based on actual temperature estimate. The initialization time $I_2$ may vary based on period of inactivity ($I_1$). It may take a sensor longer to initialize if the period of inactivity is longer. At this time the engine speed continues to vary based on engine load and other operating conditions.

In cases where the period of inactivity ($I_1$) is less than a threshold, instead of using remotely obtained temperature value alongside sensor reading during sensor initialization (second method), a default temperature value may be used alongside sensor reading for sensor initialization (first method). For cases where the period of inactivity ($I_1$) is greater than a threshold, by using first method it takes significantly longer time for the sensor to be fully initialized. In this example, by using first method sensor initialization may be achieved at time t4. At time t4, it is observed that the temperature $T_2$, as estimated by using second method is equal to the actual temperature. The time interval between time t2 and t4, is the sensor initialization period ($I_3$) is the sensor initialization time using first method. As seen in this example, $I_3$ may be significantly longer than $I_2$. Also, it takes a significantly long time ($I_3$) for the intake throttle opening based on temperature estimate from first method to be equal to throttle opening based on actual temperature estimate. During the prolonged period of inaccurate intake throttle opening, the engine operation may be adversely affected. For example, fuel economy may be degraded.

In this way, during sensor initialization after engine start-up, remotely obtained ambient condition values may be used alongside sensor readings to estimate ambient condition values close to the actual ambient condition. It is therefore possible to achieve a better accuracy in estimating related engine operating conditions.

In another representation, a method for operating a vehicle having an engine and an ambient condition sensor may comprise, during a first engine start from rest, adjusting an engine actuator based on an ambient condition determined from the sensor from the very start of engine and through the engine start-up and engine warm-up, without using remotely received values of the ambient condition; and during a second, different, engine start from rest, adjusting the engine actuator based on the ambient condition determined from remote of the vehicle while the sensor initializes, and then after the engine start and at least some warm-up, adjusting the engine actuator based on the ambient condition determined from the sensor. The operation during the second start may use various of the additional features and approaches described herein.

In one example, a method comprises during a vehicle start from rest, adjusting an engine actuator based on an ambient condition determined from remote of the vehicle while a vehicle sensor initializes, and then adjusting the engine actuator based on the ambient condition determined from the sensor. In the preceding example, additionally or optionally, the vehicle start from rest includes the vehicle start from a longer than threshold duration of rest with the engine shut down. Any or all of the preceding examples, additionally or optionally comprises during a vehicle start from shorter than the threshold duration of rest, using a default setting of the sensor to adjust the engine actuator while the sensor initializes and then adjusting the engine actuator based on the ambient condition determined from the sensor. In any or all of the preceding examples, using the default setting of the sensor additionally or optionally includes ignoring the ambient condition determined from remote of the vehicle and adjusting the engine actuator independent of the ambient condition determined from remote of the vehicle. In any or all of the preceding examples, additionally or optionally, the default setting of the sensor is filtered with a time-constant based on a time required for vehicle sensor initialization. In any or all of the preceding examples, the ambient condition is additionally or optionally determined from remote of the vehicle includes one of utilizing a last known location and a current location of the vehicle to retrieve an ambient condition estimate from remote of the vehicle. In any or all of the preceding examples, additionally or optionally, the vehicle includes a navigation system communicatively coupled to an on-board controller, the on-board controller communicatively coupled to a remote, off-board controller via a network, and wherein the ambient condition is retrieved at the on-board controller from the off-board controller via the network. In any or all of the preceding examples, additionally or optionally, the last known location or current location of the vehicle is determined at the navigation system and transmitted from the on-board controller to the remote, off-board controller via the network, and wherein the ambient condition retrieved from the off-board controller is based on the transmitted last known location or current location. In any or all of the preceding examples, additionally or optionally, the vehicle includes an on-board controller that is communicatively coupled to the on-board controller of one or more remote vehicles via a network, and wherein the ambient condition is retrieved from the on-board controller of at least one of the one or more remote vehicles. In any or all of the preceding examples, additionally or optionally, the one or more remote vehicles include vehicles within a threshold radius of the vehicle, each of the one or more remote vehicles including the vehicle sensor, and wherein the ambient condition is determined as a weighted average of the ambient condition estimated by the vehicle sensor of each of the one or more remote vehicles. In any or all of the preceding examples, additionally or optionally, the vehicle sensor includes one of an intake air temperature sensor and a humidity sensor, and wherein the ambient condition includes one of an intake aircharge temperature and an ambient humidity, and wherein the engine actuator includes one of an intake throttle and a cylinder fuel injector.

Another example method for a vehicle comprises, during a first engine restart from engine rest, adjusting an engine actuator based on an ambient condition determined from remote of the vehicle while a vehicle sensor initializes; and during a second engine restart from engine rest, adjusting the engine actuator based on an ambient condition determined from a default setting of the sensor while the vehicle sensor initializes. In the preceding example, the first engine restart is from a first duration of engine rest and wherein the second engine restart is from a second duration of engine rest, the second duration shorter than the first duration. Any or all of the preceding examples comprises, additionally or optionally, during each of the first and second engine starts, after the vehicle sensor initializes, adjusting the engine actuator based on an ambient condition determined from the vehicle sensor, wherein the vehicle sensor initializes after a third duration during the first engine restart, and wherein the vehicle sensor initializes after a fourth duration, longer than the third duration, during the second engine restart. In any or all of the preceding examples, additionally or optionally, the vehicle includes a navigation system and an on-board controller communicatively coupled to each of an off-board controller and a remote vehicle via a network, and wherein during the first engine start, the ambient condition is retrieved from each of the off-board controller and the remote vehicle. In any or all of the preceding examples, additionally or optionally, the vehicle sensor is a first sensor, and wherein during each of the first and second engine starts, adjusting the engine actuator includes adjusting an intake throttle based on feedback from a second sensor responsive to the determined ambient condition.

In yet another example, a vehicle system comprises an engine including an intake throttle; a sensor for estimating an ambient condition of the vehicle; a navigation system configured to determine a geographical location of the vehicle; an on-board controller communicatively coupled to an off-board controller, the on-board controller including computer-readable instructions stored on non-transitory memory for: during an engine start from rest, estimating a duration of sensor initialization based on a time elapsed between the engine start and a last engine shutdown; and when the duration is higher than a threshold, ignoring an output of the sensor for the duration; transmitting the geographical location of the vehicle to the off-board controller, receiving a first estimate of the ambient condition from the off-board controller based on the transmitted geographical location; and adjusting the intake throttle based on the received first estimate of the ambient condition. In the preceding example, additionally or optionally, the on-board controller of the vehicle system is a first on-board controller, the first on-board controller further communicatively coupled to a second on-board controller, the second on-board controller coupled in a remote vehicle, the remote vehicle locate within a threshold distance of the vehicle system, and wherein the on-board controller includes further instructions for: receiving a second estimate of the ambient condition from the second on-board controller, and adjusting the intake throttle based on a weighted average of the first and second estimate of the ambient condition. In any or all of the preceding examples, additionally or optionally, the on-board controller includes further instructions for: when the duration is lower than the threshold, ignoring the first estimate received from the off-board controller for the duration; and adjusting the intake throttle based on a default setting of the vehicle sensor, and independent of the first estimate. In any or all of the preceding examples, additionally or optionally, the on-board controller includes further instructions for: after the duration has elapsed, adjusting the intake throttle based on an output of the sensor.

In a further representation, a method for an engine coupled to a vehicle comprises, during a vehicle start from rest, blending a first ambient condition value estimated by a sensor on-board the vehicle with a second ambient condition value retrieved from a source external to the vehicle; and adjusting an engine actuator based on the blended value. The blending is continued for a duration based on an initialization time of the sensor, as determined by a first, fixed time constant of the sensor. The blending includes processing the first and second values with a function based on the first time constant and further based on a second, variable time constant of the sensor, the second time constant varied based on a period of engine inactivity prior to the vehicle start from rest. The period of engine inactivity may be estimated as an amount of time elapsed between the vehicle start from rest and an immediately previous engine shut-down. The blending may include, for a first, earlier portion of the duration, weighting the first value higher than the second value, and for a second, remaining, later portion of the duration, weighting the second value higher than the first value.

In this way, after engine start-up and during sensor initialization, ambient conditions data may be obtained from a plurality of reliable sources external to the vehicle. Ambient condition data retrieved from an external server and/or a remote vehicle may be used alongside sensor readings to provide a temperature estimate close to the actual temperature. The temperature estimation based on remotely obtained data is closer to the actual data compared to a temperature estimate determined using a default temperature value. The technical effect of using ambient condition data from remote sources is that sensor initialization time may be significantly reduced compared to the time required for sensor initialization using a default temperature value. By reducing the initialization time for a vehicle sensor, such as an IAT sensor, accurate ambient condition estimates, such as ACT estimates, may be obtained within a shorter time. This reduces delays in transitioning of air/fuel ratio control from open loop to closed loop mode. In general, by using close to accurate estimations of engine operating conditions, engine operation and fuel economy is improved. This method of sensor initialization using remotely obtained ambient conditions data may be used for a plurality of engine sensors.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A method, comprising:
during a vehicle start from a longer than threshold duration of rest with an engine shut down, adjusting an engine actuator based on an ambient condition determined from remote of the vehicle while a vehicle sensor initializes, and then adjusting the engine actuator based on the ambient condition determined from the sensor.

2. The method of claim 1, further comprising, during a vehicle start from shorter than the threshold duration of rest, using a default setting of the sensor to adjust the engine actuator while the sensor initializes and then adjusting the engine actuator based on the ambient condition determined from the sensor.

3. The method of claim 2, wherein using the default setting of the sensor includes ignoring the ambient condition determined from remote of the vehicle and adjusting the engine actuator independent of the ambient condition determined from remote of the vehicle.

4. The method of claim 2, wherein the default setting of the sensor is filtered with a time-constant based on a time required for vehicle sensor initialization.

5. The method of claim 1, wherein the ambient condition determined from remote of the vehicle includes one of utilizing a last known location and a current location of the vehicle to retrieve an ambient condition estimate from remote of the vehicle.

6. The method of claim 5, wherein the vehicle includes a navigation system communicatively coupled to an on-board controller, the on-board controller communicatively coupled to a remote, off-board controller via a network, and wherein the ambient condition is retrieved at the on-board controller from the off-board controller via the network.

7. The method of claim 6, wherein the last known location or current location of the vehicle is determined at the navigation system and transmitted from the on-board controller to the remote, off-board controller via the network, and wherein the ambient condition retrieved from the off-board controller is based on the transmitted last known location or current location.

8. The method of claim 1, wherein the vehicle includes an on-board controller that is communicatively coupled to an on-board controller of one or more remote vehicles via a network, and wherein the ambient condition is retrieved from the on-board controller of at least one of the one or more remote vehicles.

9. The method of claim 8, wherein the one or more remote vehicles include vehicles within a threshold radius of the vehicle, each of the one or more remote vehicles including the vehicle sensor, and wherein the ambient condition is determined as a weighted average of the ambient condition estimated by the vehicle sensor of each of the one or more remote vehicles.

10. The method of claim 1, wherein the vehicle sensor includes one of an intake air temperature sensor and a humidity sensor, wherein the ambient condition includes one of an intake aircharge temperature and an ambient humidity, and wherein the engine actuator includes one of an intake throttle and a cylinder fuel injector.

11. A method for a vehicle, comprising:
during a first engine restart after a first duration of engine rest, adjusting an engine actuator based on an ambient condition determined from remote of the vehicle while a vehicle sensor initializes; and
during a second engine restart after a second duration of engine rest, adjusting the engine actuator based on an ambient condition determined from a default setting of the vehicle sensor while the vehicle sensor initializes, wherein the second duration of engine rest is shorter than the first duration of engine rest.

12. The method of claim 11, further comprising, during each of the first and second engine restarts, after the vehicle sensor initializes, adjusting the engine actuator based on an ambient condition determined from the vehicle sensor, wherein the vehicle sensor initializes after a third duration during the first engine restart, and wherein the vehicle sensor initializes after a fourth duration, longer than the third duration, during the second engine restart.

13. The method of claim 11, wherein the vehicle includes a navigation system and an on-board controller communicatively coupled to each of an off-board controller and a remote vehicle via a network, and wherein during the first engine restart, the ambient condition is retrieved from one or more of the off-board controller and the remote vehicle.

14. The method of claim 11, wherein the vehicle sensor is a first sensor, and wherein during each of the first and second engine restarts, adjusting the engine actuator includes adjusting an intake throttle based on feedback from a second sensor responsive to the determined ambient condition.

15. A vehicle system, comprising:
an engine including an intake throttle;
a sensor for estimating an ambient condition of the vehicle;
a navigation system configured to determine a geographical location of the vehicle;
an on-board controller communicatively coupled to an off-board controller, the on-board controller including computer-readable instructions stored on non-transitory memory for:
during an engine start from rest,
estimating a duration of sensor initialization based on a time elapsed between the engine start and a last engine shutdown; and
when the duration is higher than a threshold,
ignoring an output of the sensor for the duration;
transmitting the geographical location of the vehicle to the off-board controller;
receiving a first estimate of the ambient condition from the off-board controller based on the transmitted geographical location; and
adjusting the intake throttle based on the received first estimate of the ambient condition.

16. The system of claim 15, wherein the on-board controller of the vehicle system is a first on-board controller, the first on-board controller further communicatively coupled to a second on-board controller, the second on-board controller coupled in a remote vehicle, the remote vehicle located within a threshold distance of the vehicle system, and wherein the on-board controller includes further instructions for:
receiving a second estimate of the ambient condition from the second on-board controller; and
adjusting the intake throttle based on a weighted average of the first and second estimates of the ambient condition.

17. The system of claim 15, wherein the on-board controller includes further instructions for:
when the duration is lower than the threshold,
ignoring the first estimate received from the off-board controller for the duration; and
adjusting the intake throttle based on a default setting of the vehicle sensor, and independent of the first estimate.

18. The system of claim 17, wherein the on-board controller includes further instructions for:
after the duration has elapsed, adjusting the intake throttle based on an output of the sensor.

* * * * *